Patented Mar. 29, 1932

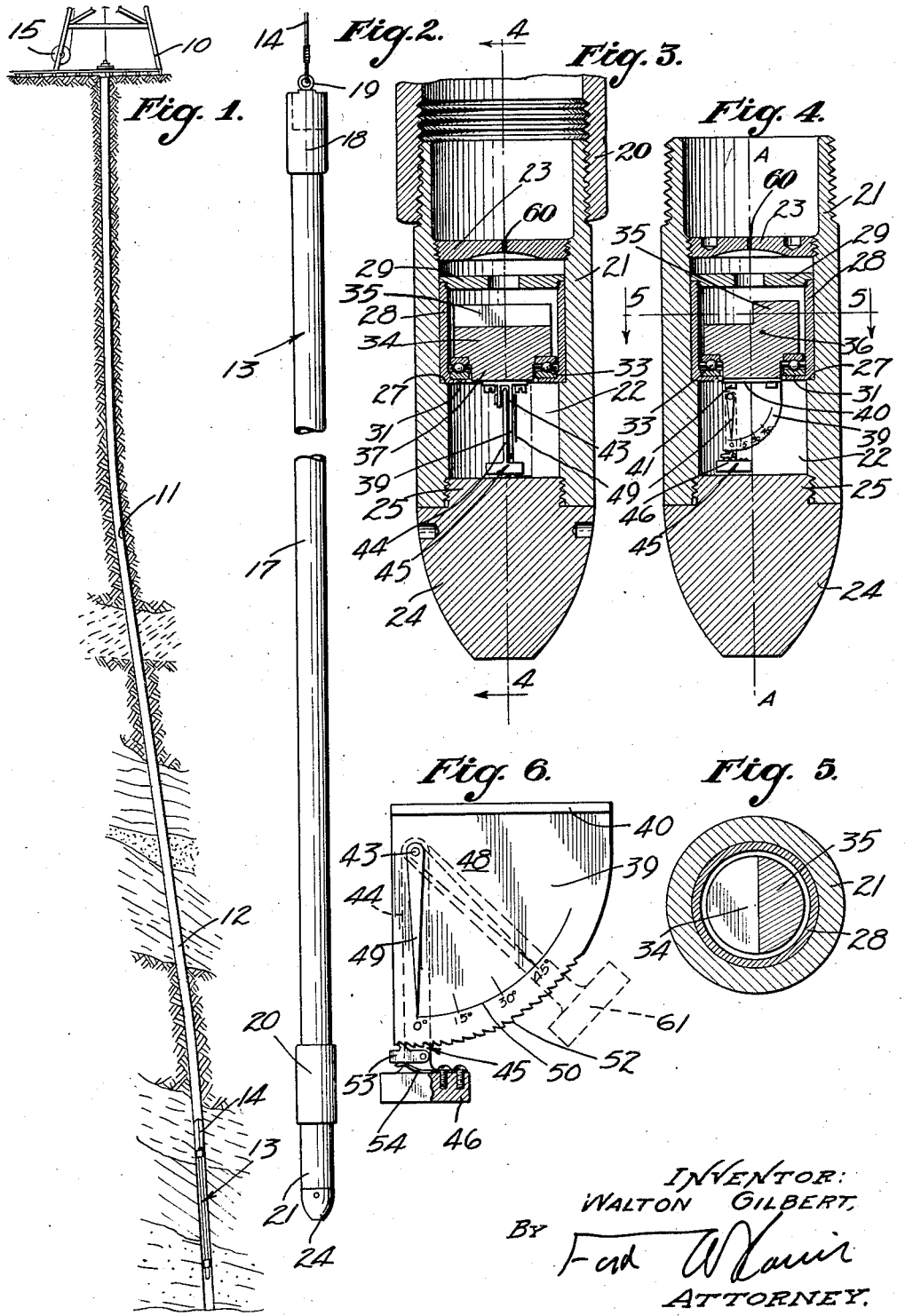

1,851,169

UNITED STATES PATENT OFFICE

WALTON GILBERT, OF PASADENA, CALIFORNIA, ASSIGNOR TO SHELL OIL COMPANY, OF SAN FRANCISCO, CALIFORNIA, A CORPORATION OF CALIFORNIA

MAXIMUM INCLINATION GAUGE

Application filed April 18, 1927. Serial No. 184,503.

My invention relates to inclination gauges and relates particularly to an inclination gauge which is adapted for measuring the inclination from vertical of a bore-hole.

In the oil-producing industry where wells are drilled to great depths, it is valuable both to the well driller and the geologist to know the maximum inclination of the bore-hole.

It is an object of this invention to provide an inclination gauge which will accurately register the maximum inclination of a bore-hole.

A further object of this invention is to provide an inclination gauge of the character mentioned which may be lowered and raised in a bore-hole by means of a rigid member such as a pipe or a flexible member such as a cable.

A still further object of this invention is to provide an inclination gauge which registers the maximum inclination regardless of the direction of inclination of the bore-hole.

Other objects and the salient advantages of the invention will be pointed out in the ensuing description.

My invention may be best understood by reference to the accompanying drawings in which:

Fig. 1 is a diagrammatic view illustrating the utility of the invention.

Fig. 2 is an elevational view showing the invention in full.

Fig. 3 is an enlarged vertical cross section taken through the lower end of Fig. 1.

Fig. 4 is a section taken as indicated by the line 4—4 of Fig. 3.

Fig. 5 is a cross section taken on the line 5—5 of Fig. 4.

Fig. 6 is an enlarged view of a pendulum and the mechanism of the invention associated directly therewith.

Referring to Fig. 1, 11 represents a well, at the upper end of which is a well derrick 10. The well 11 is shown as being encased by a well casing 12. An inclination gauge 13 is shown in a position at the lower end of the well 11, being lowered to this point by means of a flexible member in the form of a cable 14 which is wound on a drum 15 of the derrick 10. The well 11 is considerably inclined from a vertical plane near the central part thereof. The inclination gauge 13 is so constructed that in passing downward through the well casing 12 the maximum inclination will be registered.

The details of the inclination gauge are shown in Figs. 2 to 6 inclusive. In Fig. 2 I show a support-tube 17 which forms a part of the inclination gauge 13. The upper end of the support-tube 17 is provided with a collar 18 having an attachment means 19, by means of which the flexible cable 14 is attached to the inclination gauge. Attached to the lower end of the support-tube 17 is a collar 20 to which a casing 21 is secured. The casing 21 provides a cavity 22, the upper end of which is closed by a plug 23 which is threadedly secured in place, and the lower end of which is closed by a nose 24 having a threaded projection 25 which screws into the lower end of the cavity 22. The upper part of the cavity 22 is larger than the lower part thereof and an annular shoulder 27 is provided. Placed in the upper part of the cavity 22 and engaging the shoulder 27 is a shell 28 having a perforated cover 29. The lower part of the shell 28 has an annular flange 31 which supports a thrust bearing 33. The thrust bearing 33 carries a rotatable body or eccentrically-weighted member 34. The eccentrically-weighted member 34 is provided with an eccentric weight 35 so that the center of gravity or center of mass of the member is at a point indicated at 36 in Fig. 4, this point being eccentric to an axis of rotation A—A of the eccentrically-weighted member 34, this axis A—A being concentric with the axis of the casing 21 and the support-tube 17. The eccentrically-weighted member 34 has a concentric boss 37 which projects downward through the thrust bearing 33 and through the opening provided inside the annular flange 31 of the shell 28.

Secured to the lower face of the boss 37 is a segment-plate 39 which is provided with flanges 40 through which screws 41 extend for making the attachment. Pivotally supported by the segment-plate 39 is a shaft 43. The segment-plate 39 provides a pair of spaced bearings as illustrated in Fig. 3. Secured on the shaft 43 between the bearings is a depending arm 44 of a pendulum 45. The pendulum 45 also includes a weight 46 which is located at the lower end of the arm 44 below the segment-plate 39. The pendulum 45 is so mounted that it is adapted to swing in a vertical plane which passes through the axis A—A and through the center of mass 36 of the eccentrically-weighted member 34. In other words, the pendulum 45 is pivotally associated with the eccentrically-weighted member 34 diametrically opposite the center of mass 36. One end of the shaft 43 which is adjacent to a segment 48 of the segment-plate 39 is provided with a pointer 49 which extends parallel to the arm 44 of the pendulum 45. Formed on the plate 48 is an arcuated scale 50 which reads in degrees. When the inclination gauge is in vertical position as illustrated in Figs. 2 to 6 inclusive, the pendulum and the pointer occupy positions illustrated in full lines so that the pointer indicates the zero degrees on the scale 50.

The lower edge of the plate 48 is generated concentrically around the shaft 43 and is provided with ratchet teeth 52. Pivoted to the arm 44 of the pendulum 45 is a pawl 53 which is capable of engaging the teeth 52. A spring 54 which is attached to the weight 46 is provided for urging the pawl 53 into engagement with the teeth 52. The pawl is so pivoted that it permits the pendulum to swing in a direction toward the axis A—A but prevents it from swinging in an opposite direction.

The cavity 22 is preferably filled with a light liquid such as kerosene for the purpose of lubricating the parts and also for the purpose of obtaining a dash-pot action on the pendulum in order to keep it from swinging beyond correct position due to its momentum. I desire to provide a small opening 60 in the cover 23 so that the pressure in the well may be transferred to the liquid in the cavity 22 so that an equalization of pressure will be effected.

The operation of the invention is substantially as follows:

When it is desired to determine the maximum inclination of a bore-hole the pendulum is placed in a zero position as illustrated in Fig. 6, and the inclination gauge is attached to the lower end of a lower member, care being used to maintain it in a vertical position. The inclination gauge is then lowered into a well. As long as the well is vertical, the pendulum will remain in the position shown in full lines in Fig. 6, but if the well inclines from vertical the pendulum will swing into the position indicated by dotted lines 61 for example. Dotted line position 61 is, of course, an extreme position, shown only for the purpose of illustration. The eccentrically-weighted member 34 being free to rotate and being eccentrically-weighted will always occupy such a position that the center of gravity 36 is at the lowest point of a circular path generated around the axis A—A and resting in a plane at right angles thereto. In other words, the center of mass 36 is in such position that the plane of maximum tilt passes through it and also through axis A—A. The pendulum 45 being diametrically opposite the center of the point 36 will, therefore, also be in the plane of maximum tilt which passes through the axis of rotation A—A and the center of mass 36. The pendulum, instead of being on the low side as of the center of mass 36, will be on the high side and, therefore, the weight 46 will swing around the axis of rotation A—A. The ratchet arrangement permits the pendulum to swing in this direction, but prevents it from swinging in an opposite direction. For this reason the pendulum and likewise the pointer will be retained in their extreme rightward position and a correct reading of the maximum inclination will be obtained. As an example, let us assume that in one part of the well the maximum inclination in any direction is fifteen degrees. When the inclination gauge passes this point, the pendulum will swing so that the pointer 49 will register fifteen degrees. Let us assume that at another point in the well the maximum inclination is forty-five degrees. When the inclination gauge passes this point, the pendulum will swing from a position in which the pointer indicates fifteen degrees into the position indicated by dotted lines 61 in which the pointer indicates forty-five degrees. In being withdrawn from the well, the inclination gauge will return to a maximum inclination of fifteen degrees and then into a vertical position at the upper end of the well. The ratchet means, however, will prevent the pendulum from swinging away from the axis of rotation and consequently the reading on the scale 50 will be the true maximum inclination of the well 11. The support-tube 17 is long enough and is of such a diameter that the mechanism at the lower end thereof will be substantially centralized in the well at all times.

From the foregoing description it will be seen that the device of my invention is simple in construction and is positive in operation. The device indicates the maximum inclination of a bore-hole regardless of the direction of inclination or regardless of the depth of the part of the well which is at a maximum inclination.

I claim as my invention:

1. In a device for measuring and registering the maximum deviation of bore-holes from vertical: an elongated casing; an eccentric weight mounted within said casing so as to be free to rotate about an axis parallel to the length of the casing; a pendulum attached to said eccentric weight, remote from the center of mass of said eccentric weight to oscillate in a plane passing through the center of mass and the axis of rotation of said eccentric weight, said pendulum being free to incline in the direction of the center of mass of said eccentric weight, automatic means for preventing said pendulum from swinging in a reverse direction; a segment affixed to said eccentric weight; and a pointer attached to said pendulum for indicating the amount of inclination of said device from vertical.

2. In a device for measuring and registering the maximum deviation of a bore-hole from vertical, the combination of: an elongated casing disposed to center itself in a bore-hole; a weight within said casing, said weight being mounted to rotate about the axis of said casing, and being eccentrically-weighted so that the center of mass thereof is eccentric to said axis; a pendulum supported by said weight and free to swing toward said axis of rotation; automatic means preventing swinging of said pendulum in a reverse direction, and means for lowering said device into a bore-hole.

3. A self-contained device to be lowered into a bore hole for quickly determining the maximum inclination of the bore hole from vertical, said device comprising: a tube of sufficient length to center itself in said hole; means for passing said tube throughout the variously inclined portions of said hole; means in said tube progressively indicating the inclination from vertical of whatever portions of said bore have a greater degree of inclination than the preceding portions thereof, irrespective of the direction of said inclination; and means in said tube for registering the maximum angle of inclination indicated by said indicating means during the passage of said tube through said bore.

4. A self-contained device to be lowered into a bore hole for quickly determining the maximum inclination of the bore hole from vertical, said device comprising: a tube of sufficient length to center itself in said hole; means for passing said tube throughout the variously inclined portions of said hole; an eccentric weight mounted within said tube so as to be free to rotate about an axis parallel with said tube, said weight being eccentric to said axis; a pendulum pivotally attached upon said weight on an axis normal to the plane including both the axis of rotation and center of mass of said weight; a quadrant mounted on said weight so that said pendulum may describe an arcuate path across a surface of said quadrant; and means permitting said pendulum to move over said path as the inclination of said bore hole increases but preventing a return movement of said pendulum over said path as said inclination decreases.

5. A self-contained device to be lowered into a bore hole for quickly determining the maximum inclination of the bore hole from vertical, said device comprising: a tube of sufficient length to center itself in said hole; means for passing said tube throughout the variously inclined portions of said hole; an eccentric weight mounted within said tube so as to be free to rotate about an axis parallel with said tube, said weight being eccentric to said axis; a pendulum pivotally attached upon said weight on an axis normal to the plane including both the axis of rotation and center of mass of said weight; a quadrant mounted on said weight so that said pendulum may describe an arcuate path across a surface of said quadrant; and means permitting said pendulum to move over said path as the inclination of said bore hole increases but preventing a return movement of said pendulum over said path as said inclination decreases, said means including teeth formed on said quadrant and a spring actuated dog carried by said pendulum and engaging said teeth.

6. A self-contained device to be lowered into a bore hole for quickly determining the maximum inclination of the bore hole from vertical, said device comprising: a tube of sufficient length to center itself in said hole; means for passing said tube throughout the variously inclined portions of said hole; an eccentric weight mounted within said tube so as to be free to rotate about an axis parallel with said tube, said weight being eccentric to said axis; a pendulum pivotally attached upon said weight on an axis normal to the plane including both the axis of rotation and center of mass of said weight; a quadrant mounted on said weight so that said pendulum may describe an arcuate path across a surface of said quadrant; a pointer carried by said pendulum over said path as the inclination of said bore hole increases; and means retaining said pointer from retracing said path when the inclination of said bore hole decreases.

7. A device for measuring and registering the maximum deviation of bore-holes from vertical, said device comprising: an elongated casing; an eccentric weight mounted within said casing so as to be free to rotate about an axis parallel to the length of the casing, said weight being eccentric to said axis; a pendulum attached to said eccentric weight remote from the center of mass of said eccentric weight to oscillate in a plane passing through the center of mass and the axis of rotation of said eccentric weight, said pendulum being free to incline in the direction of the center of mass of said eccentric weight; a segment secured to said eccentric weight; automatic means for preventing said pendulum from swinging in a reverse direction, said means including a ratchet formed on said segment and a pawl carried by said pendulum; and a pointer attached to said pendulum for indicating the degree of inclination of said device from vertical.

In testimony whereof, I have hereunto set my hand at Los Angeles, California, this 12th day of April, 1927.

<div style="text-align:center">WALTON GILBERT.</div>